US006484152B1

(12) United States Patent
Robinson

(10) Patent No.: US 6,484,152 B1
(45) Date of Patent: Nov. 19, 2002

(54) AUTOMATED PORTFOLIO SELECTION SYSTEM

(75) Inventor: Herbert W. Robinson, Potomac, MD (US)

(73) Assignee: OptimumPortfolio.com, LLC, Potomac, MD (US)

( * ) Notice: Subject to any disclaimer, the term of this patent is extended or adjusted under 35 U.S.C. 154(b) by 0 days.

(21) Appl. No.: 09/473,711

(22) Filed: Dec. 29, 1999

(51) Int. Cl.[7] .............................................. G06F 17/60

(52) U.S. Cl. .............................. 705/36; 705/35; 705/7

(58) Field of Search ................................ 705/36, 35, 7

(56) References Cited

U.S. PATENT DOCUMENTS

| | | | | |
|---|---|---|---|---|
| 5,303,328 A | * | 4/1994 | Masui et al. | 395/23 |
| 5,675,746 A | * | 10/1997 | Marshall | 395/235 |
| 5,761,442 A | * | 6/1998 | Barr et al. | 395/236 |
| 5,806,047 A | * | 9/1998 | Hackel et al. | 705/36 |
| 5,978,778 A | * | 11/1999 | O'Shaughnessy | 705/36 |
| 5,987,433 A | * | 11/1999 | Crapo | 705/36 |
| 5,991,744 A | * | 11/1999 | DiCresce | 705/36 |
| 6,021,397 A | * | 2/2000 | Jones et al. | 705/36 |
| 6,026,381 A | * | 2/2000 | Barton, III et al. | 705/35 |
| 6,026,382 A | * | 2/2000 | Kalthoff | 705/35 |
| 6,029,146 A | * | 2/2000 | Hawkins et al. | 705/35 |
| 6,029,148 A | * | 2/2000 | Zurstrassen | 705/36 |
| 6,018,722 A | * | 6/2000 | Ray et al. | 795/36 |

FOREIGN PATENT DOCUMENTS

| | | | | |
|---|---|---|---|---|
| WO | 64/10637 | * | 12/1992 | G06F/15/21 |
| WO | 92/22036 | * | 12/1992 | G06F/15/21 |
| WO | 96/05563 | * | 2/1996 | G06F/17/60 |
| WO | 97/08640 | * | 3/1997 | G06F/17/60 |
| WO | 97/30407 | * | 8/1997 | G06F/17/60 |

OTHER PUBLICATIONS

Zopounidis, Constantin, Doumpos, Michael; Stock Evalutation using a preference disaggregation methodology; , Decision Sciences by American Institute for Decision Sciences; v30; No., 2. Apr. 1999.*

Gilliland, Steve;Take stock of your finance: investment software; Computer Shopper; v141 No. 3, p 512, Mar. 1994.*

Wong, FS, Wang, PZ, Goh, TH; Fuzzy Neural Systems for Decision Making; IEEE Int'l. Conf. on Neural Networks, v2, p 1625–1637, Nov. 1991.*

Kandt, K, Yuenger,P; A Financial Investment assistant; ed. by Konsynski, BR; Proceedings of the 21 st. Hawaii Int'l. Conf. on System Sciences, vol. III;p510–517, Jan. 1998.*

Chou,ST, Hsu, H, Yang, C, Lai, F; A Stock Selection DSS combining Al and technical analysis; Annales of Operations Research, ed. by P. L. Hammer; v75.Baltzer Science Publishers; p335–353, Apr. 1999.*

* cited by examiner

Primary Examiner—Vincent Millin
Assistant Examiner—Pedro Kanof
(74) Attorney, Agent, or Firm—Pillsbury Winthrop LLP

(57) ABSTRACT

A method of automatically selecting a securities portfolio from a plurality of securities includes selecting investment characteristics and investment limits considered important for investment objectives; selecting a safety level for the portfolio; constructing a matrix having entries corresponding to (a) the selected characteristics and limits, and (b) the candidate securities; establishing an objective function corresponding to the constructed matrix; and determining the securities portfolio based on the matrix and the objective function. The investment characteristics may include dividends, rate of growth of earnings, financial strength, safety, predictability of earnings, and performance rankings provided by an advisory service. The safety level may be provided as a number of stocks to include in the portfolio. The selected investment limits may relate to limitations on the amount of investment in each candidate security. At least one selected investment limit may relate to a standardized commercial rating or a measure of financial strength.

7 Claims, 15 Drawing Sheets

Thousands of securities are available. The investor's problem is how to select from the millions of possible combinations of securities the one which best meets his own specific requirements and characteristic - his true optimum portfolio. Using our disciplined Optimum Portfolio.com system we establish the investor's preferences, quantify all candidate stocks' characteristics, and then employ a hi-tech mathematical process called "linear programming" to systematically select his optimum portfolio.

Common prudence suggests that the investor does not put all his eggs in one basket - one stock or one fixed income security. He should divide his portfolio between stocks and income securities. His stock portfolio should, to reduce risk, consist of a substantial number of stocks. He could have equal dollar amounts invested in each stock or, more prudently, amounts in proportion to financial risk.

Fig. 3A

Building a portfolio based on a disciplined evaluation of investments requires objective standards which can be applied universally to all stocks. The highly respected Value Line Investment Survey has, since World War II, provided exactly such standards, based on statistical research, in the form of "ratings," rankings, and measurements of all the key characteristic regarding safety, earnings, yield and performance of each stock in a universe of 1700 stocks. Since Value Line is the only source of such comprehensive, objective measurements OptimumPortfolio.com bases its automated portfolio selection system on the use of this Value Line data. In particular, portfolios will only be selected from the 1,300 stocks ranked 1, 2 or 3 by Value Line for "Timeliness". Those ranked 4 and 5 will be excluded.

It is, of course, possible to allocate investment in stocks by a system of filters, filtering by one Value Line ranking after another, narrowing down the stocks finally to the small set with the combination of Value Line rankings desired. This will tend to find a good portfolio of stocks to match the investor's requirements. But it is not the optimum. It fails to consider all possible trade-offs between stocks. A simple example illustrates the problem involved. If we have the four alternative investments below how would you select a portfolio if you have $1,000 to invest?

Fig. 3B

Every combination yields an average safety, average growth, a level of earnings and a cash return (dividends plus interest). Changing it by substituting one security for another changes all of these and trades-off the improvement in one feature in exchange for resulting changes in the other features. The challenge is to explore all combinations possible and find the one whose features optimally match your needs. With more characteristics and a substantial number of stocks, the number of possible combinations becomes enormous and the task is impossible to solve manually. Our automated portfolio selection system solves it in seconds, using a high-speed computer capable of performing millions of operations per second. It will find the portfolio best suited to any investor's needs - for a widow just as readily as for a young risk-toleration computer programmer.

From a series of evaluations made by the investor himself the system determines his preferences and objectives and then, from the 1700 Value Line stocks at current prices, and money market securities, selects the optimum portfolio tailored to satisfy his particular requirements.

To apply our approach to your own requirements proceed through the following pages.

Your optimum portfolio will be printed out showing the percentage of your portfolio dollars invested in each security plus the following summary of the portfolio per $1,000 total investment.

Fig. 3D

Optimum Portfolio Selection Procedure

Page 1

We offer two alternative optimum stock portfolios:

A. Portfolio dollars invested equally in each stock

B. More prudently, a dollar amount invested in each stock in proportion to the four levels of Value Line's "Financial Strength" rating. The ratios are 4:3:2:1.

In both cases a measure of the relative importance of each stock to meeting the investor needs will be included in the print-out.

Make your selection by clicking on A or B.

Type in the number of stocks you wish to include in the portfolio.  Number _____

In the case of option B, the exact number of stocks will depend on your preferences as revealed below.

Note: We recommend that you choose a number sufficiently large to enable you to exercise judgement in excluding some stocks or adjusting the percentage invested in others.

Fig. 3F

Constraints

Page 2

Do you wish to specify any of the following requirements which your optimum portfolio must satisfy? If so, fill in the levels required:

Note: Over-constraining the portfolio may make it impossible to find any combination which satisfies all constraints.

Cash return % _____

Maximum portfolio average price / earnings ratio _____

Risk: Maximum Average Beta _____

Fig. 3G

Page 3

Safety

To enable us to take your risk-tolerance into account in optimizing your portfolio please put your own valuation on the Value Line Safety ranking in proportion to a value of 10 for rank 1.

Rank 1     10
Rank 2     ___
Rank 3     ___
Rank 4     ___
Rank 5     ___

An investment in income securities will be assigned a value of 10. You have your own preferred sources of income securities - money market, bonds, etc. To simplify we assume you can obtain a return on such securities of __5__ percent. If you can earn more, the cash return from the portfolio would be that much more.

Fig. 3H

Factors

Page 4

We will optimize your portfolio based on any selection you wish to make from the following factors additional to "Safety," all of which are important for stock valuation. Indicate which you choose by typing "x".

Yes

Value Line "Timeliness"
Sales per share:
    % Increase in next 12 months    \_\_\_\_
"Earnings Predictability"    \_\_\_\_
Earnings per share:
    Increase in next 12 months
    Increase by 2002-2004    \_\_\_\_
Dividends per share increase by 2002-2004    \_\_\_\_
Return on Equity
Price-Growth Persistence Note: Including too many factors in your combination may decrease the possible discrimination between stocks.

Fig. 3I

Page 5

Value Line's Timeliness' rankings have gained a reputation for identifying those stocks with the greatest potential for short-run relative market performance. Please put your valuation on the Value Line "Timeliness" rankings 1-3 in proportion to a value of 10 for rank 1.

Rank 1    10
Rank 2    ___
Rank 3    ___

Note: We have assumed that you would exclude from your portfolio any stocks ranked 4 or 5 in Timeliness by Value Line.

Fig. 3J

Page 6

You have selected the following factors to be considered in optimizing your portfolio. Weight the facts in proportion to your valuation of their importance for your needs and, in your estimation, for growth potential, allocating a total of 100. This will establish your investment objective.

| Factor | Weight |
|--------|--------|
| Safety | --- |
| ...    | --- |
| ...    | --- |
| ...    | --- |
| ...    | --- |
| Total  | 100 |

Fig. 3K

AUTOMATED PORTFOLIO SELECTION SYSTEM

BACKGROUND OF THE INVENTION

1. Field of Invention

This invention relates to automated portfolio selection. More particularly, this invention relates to methods and systems for automated selection of an investment portfolio based on the user's own criteria and his relative valuations thereof.

2. Background

All stocks, in varying degrees, from blue chips to highly speculative start-ups, are risky. Although in stock market investing it is generally accepted that "the more risk the more gain," every investor must put some limit on risk when investing. In order to reduce total risk, even the least risk-averse investor should buy a large number of different stocks to construct a diversified portfolio.

Each investor has his own personal and economic characteristics which determine how much capital the user can invest, his need for cash income, and his willingness to accept risk. Since every stock has its own characteristics relating to earnings, dividends, growth potential, volatility and safety, the user should be able to construct a portfolio which is exactly tailored to his needs. The central problem every investor faces is, therefore, to find some rational systematic method of selecting this portfolio from the thousands of stocks available. Ideally, the combination of individual securities should constitute, as it were, a "synthetic security" which has the set of characteristics which best satisfy his particular requirements.

SUMMARY OF THE INVENTION

This invention provides, in one aspect, an automated portfolio selection system that utilizes technological advances to solve the "mix" problem involved in portfolio selection. The system according to the present invention uses mathematical programming and computers to enable systematic selection, from the millions of combinations of stocks that could be bought with the capital available from a universe of candidate stocks, that combination of stocks that provides the maximum satisfaction of any particular investor's requirements.

In one aspect, this invention provides a method of automatically selecting a securities portfolio from a plurality of securities. The method includes selecting investment characteristics and investment limits considered important for investment objectives; selecting a safety level for the portfolio; constructing a matrix having entries corresponding to (a) the selected characteristics and limits, and (b) the candidate securities; establishing an objective function corresponding to the constructed matrix; and determining the securities portfolio based on the matrix and the objective function. In some embodiments of this invention, the investment characteristics may be selected from the group comprising: dividends, rate of growth of earnings, financial strength, safety, predictability of earnings, and performance rankings provided by an advisory service. In some embodiments, the safety level is provided as a number of stocks to include in the portfolio.

The selected investment limits may relate to limitations on the amount of investment in each candidate security. At least one selected investment limit may relate to a standardized commercial rating or a measure of financial strength.

In some embodiments, the establishing of the objective function further comprises: standardizing units of all factors; and establishing a degree of importance of factors. In some embodiments, the standardizing units of all factors includes, when a factor is specified in units of "dollars per share", dividing the factor by the price. The establishing of the objective function may include, when a factor is specified in units of "dollars per share", using the actual value; and when a factor is a non-dollar factor, multiplying the factor by the price.

In some embodiments, the selected portfolio provides an optimum portfolio for a particular investor based on the investor's risk-tolerance and revealed preferences for cash income and capital appreciation.

In another aspect, this invention provides a computer-based system programmed to perform the methods of this invention.

In yet another aspect, this invention provides a method of revealing relative effects on achievement of an investor's objectives of adding or subtracting one dollar of investment in each security in that investor's portfolio.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present-invention throughout the several views and wherein:

FIGS. 3A–3M show various display screens which would seen by a user during a typical interaction with a system according to an embodiment of the present invention.

DETAILED DESCRIPTION OF THE PRESENTLY PREFERRED EXEMPLARY EMBODIMENTS

System Configuration and Implementation

Figure 1:
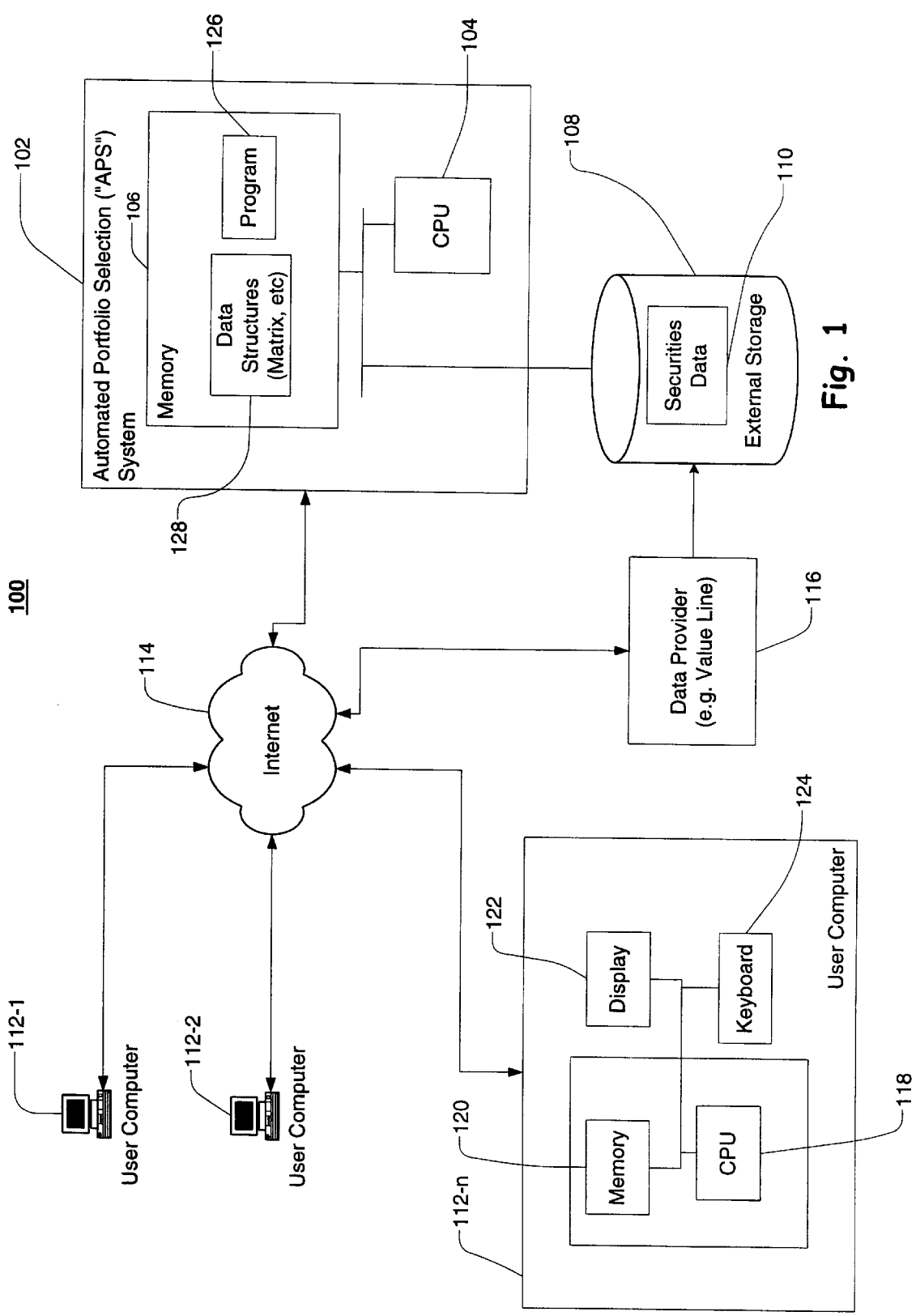
FIG. 1 depicts a typical system according to an embodiment of the present invention.

An embodiment of the Automated Portfolio Selection ("APS") System according to the present invention has been implemented using a system 100 as shown in FIG. 1. Automated Portfolio Selection System 102 has at least one processor (CPU) 104 and a random access memory (RAM) 106. Connected to APS system 102 are various standard input, output and control devices (not shown), such as, e.g., a keyboard and a mouse), to facilitate the assembly and processing of data. Associated with APS system 102 is secondary storage 108, such as, for example, optical disks, hard disks, etc., for storing programs as well as securities data 110, including convertible securities data and mutual fund data. The securities data 110 includes data obtained from external sources and will preferably include such historical data and data derived from the historical data as may be required.

Various enhanced co-processor chips (not shown) may be installed into APS system 102 to work in conjunction with the CPU 104 in order to increase the processing power of the computer.

APS System 102 is preferably accessible to users via user computers 112-1, 112-2, . . . , 112-n, either directly or via a public network such as the Internet 114. The securities data 110 may also be available directly to users of the APS system 102, e.g. via data provider 116.

Preferably the securities data 110 includes historical information on the major companies in the United States, Canada and abroad.

In a preferred embodiment, the securities data 110 is obtained by the APS System 102 from Value Line (Value Line Securities, Inc., 220 East 42nd Street, New York, N.Y. 10017). The securities data 110 may include data from various of Value Line's files, including Value Line's Estimates & Projections File, Convertible Securities File, Mutual Fund DataFile, and the Value Line DataFile.

The Value Line DataFile provides comprehensive, historical information on the major companies in the United States, Canada and abroad. The Value Line DataFile allows access to numeric data presented in electronic form. It is fully updated and adjusted weekly for stock splits, stock dividends and CUSIP changes. Value Line provides a tool to aid in studying the securities markets and forecasting and evaluating corporate results. DataFile an historical database with over 5,000 securities currently listed on the major North American exchanges as well as NASDAQ and the OTC markets, with market capitalization in excess of $10 million. These securities include companies found in major indices, including the Dow Jones Industrial Average, Russell 2,000, Toronto 300, the S&P 500 and those also found in Value Line's print Investment Survey and Investment Survey-Expanded Edition.

Value Line's treatment of data for DataFile is on an "as reported" basis, which does not restate prior period adjustments such as mergers, acquisitions and spin-offs. Annual data is available as far back as 1955, and quarterly data since 1963. The DataFile contains comprehensive market statistical and financial information such as income statements, balance sheets, cash flow statements, pet share data and pre-calculated, analytical ratios which provide these data elements in six major format types: Standard Industrial, Banks, Thrifts/Savings & Loans, Insurance, Securities Brokerage and Finance.

Volume data is reported monthly and price data is reported both weekly and monthly. A Value Line Quarterly Database has over one hundred (100) data fields with full 10-Q information available since 1985 in formats such as: Standard Industrial, Insurance, Banks and Thrifts/Savings & Loans.

The Value Line Data File contains the following information:

Fourteen million data items for the past twenty years

A file of annual data going back to 1955 expanded to four hundred data items since 1969

Expanded quarterly data with an additional one hundred and seven items since 1985

Pre -calculated analytical ratios such as:
1. debt-to-capital
2. price-to-book value
3. utility expense ratio after depreciation & tax
4. percent of debt to equity
5. historical five and ten year growth rates The Value Line DataFile also provides:

full balance sheet data income statements per share data sources and uses of funds analytical ratios rates of return tax data capital and equity structure detailed earnings data debt and convertible obligations foreign sales The Convertible Securities File provides data for almost six hundred convertible securities with a total market value of over $60 billion. The Value Line Convertible File provides up to one hundred and fifty key items of information, updated weekly. The Value Line Convertible File issues in a typical week consist of four hundred and forty convertible bonds, one hundred and sixty five convertible preferred stocks and sixty Euro-convertibles.

Value Line's Mutual Fund DataFile is a database covers over 6,000 of the most popular domestic equity and bond funds. Value Line's mutual fund analysts provide a written analysis on over 1,500 of these funds. The Mutual Fund DataFile provides monthly pricing, basic fund information, weekly performance data, sector weightings, holdings data, historical monthly returns, per share data and much more. This information is updated every week and made available on-line.

Value Line's Estimates & Projections File includes estimates and projections. on approximately 1,700 companies and industries, and each security and industry aggregate is analyzed according to more than seventy different variables, computed statistically. Quarterly estimate data include sales/revenues and earnings per share. Estimate data is projected for the current year, the next year and the next three to five year period, and contains such data items as an investment measure of Timeliness (the projected relative price performance of a stock in the next 12 months) based on long-term historical earnings, prices, price and earnings momentum and earnings surprise.

a Safety Ranking—a comprehensive measure of risk including all factors peculiar to a company's business. In some cases the Safety Ranking is derived by averaging two variables: Index of Price Stability and Financial Strength rating an Index of Earnings Predictability, based upon the stability of year-to-year quarterly earnings comparisons an index of Price Growth Persistence, a measure of the consistence of the stock's growth in price relative to the market a standard deviation of percent price changes measures the volatility of a stock, including both market sensitivity and a stock's inherent instability Year-ahead estimates on such variables as earnings per share and dividends per share Projected growth rates of key financial measures Annual estimates of up to twenty three financial indicators Measure of price stability Quarterly estimates Sales/Revenues Operating Margins Net Profit Projected three to five year Earnings and Sales Estimated three to five year growth rates for Sales, Cash Flow, EPS, Dividends and Book Value Beta, financial strength, and,; operating margins; up to twenty three financial measures of annual estimates and projected three to five year price targets.

As noted above, APS System 102 is accessible to users via user computer systems 112-1, 112-2, . . . , 112-n, either directly or via a public network such as the Internet 114. In preferred embodiments a user may access the APS system 102 using any mechanism (e.g., a computer with browser) for accessing the Internet 114. A typical user access is via a user computer system such as user computer system 112-n which has a processor 118, a memory 120, a display 122 and some form of input device such as a keyboard 124. The display 122 is connected to user computer system 112-n to display commands, images, and other information produced by the computer system. The user computer system 112-n includes software such as an Internet browser to access the APS System 102.

In the presently preferred embodiments (at the time this application is being written) an IBM PC with an Intel processor is used as APS system 102, but the configuration may be enhanced to handle demand.

The software of the present invention, APS program 126, implemented on APS system 102 can be written in any suitable high-level computer language. In the present embodiment, the software is written in a combination of the programming languages/systems Microsoft Visual Basic™ and Lotus 1-2-3. Further, while aspects of the present invention have been implemented in software running on a computer system as described above, all aspects of the present invention can also be implemented in hardware.

Overview of Operation of the System

Figure 2:
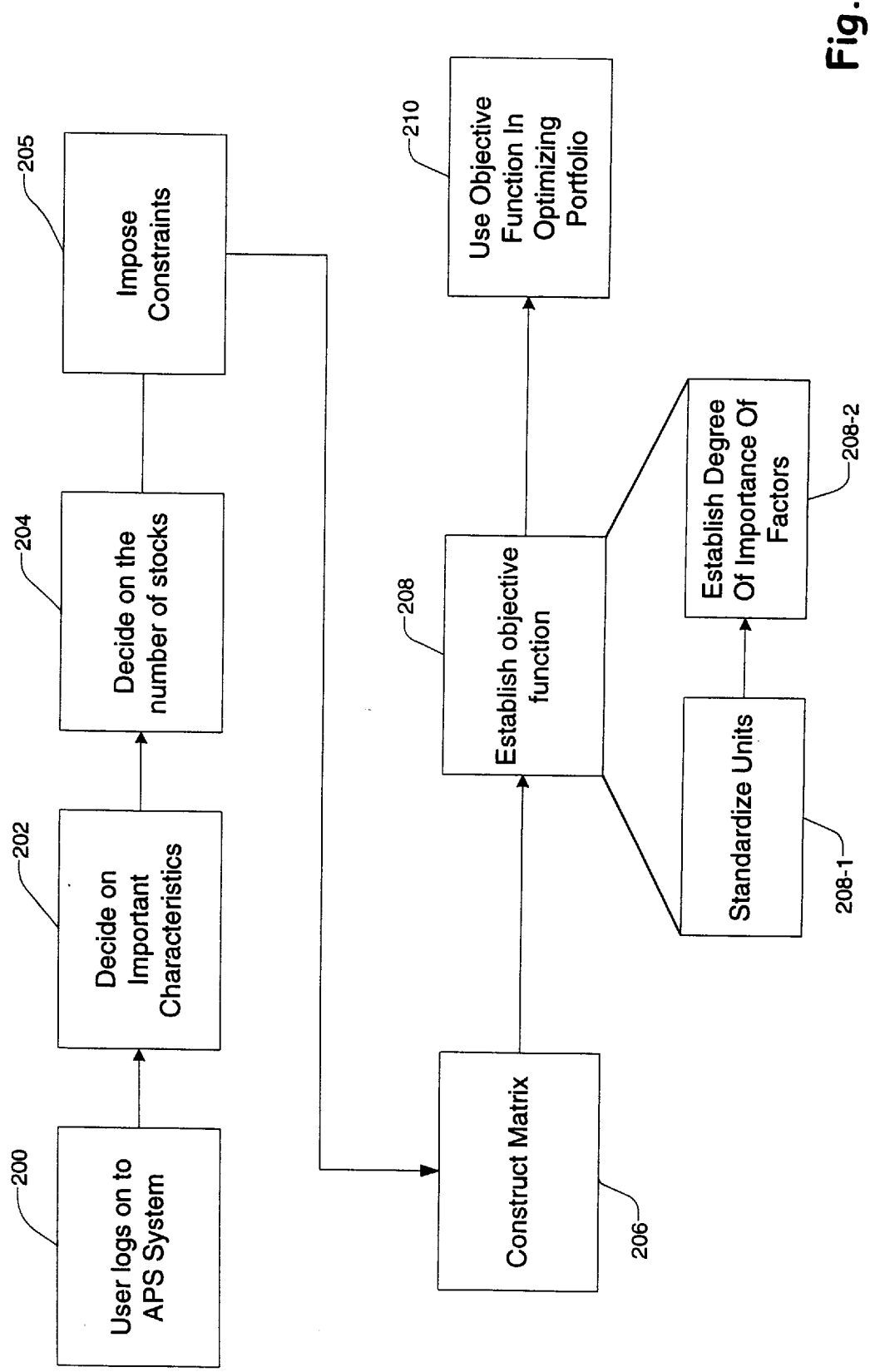
FIG. 2 is a flowchart showing the operation of an embodiment of the present invention.
Figure 3C:
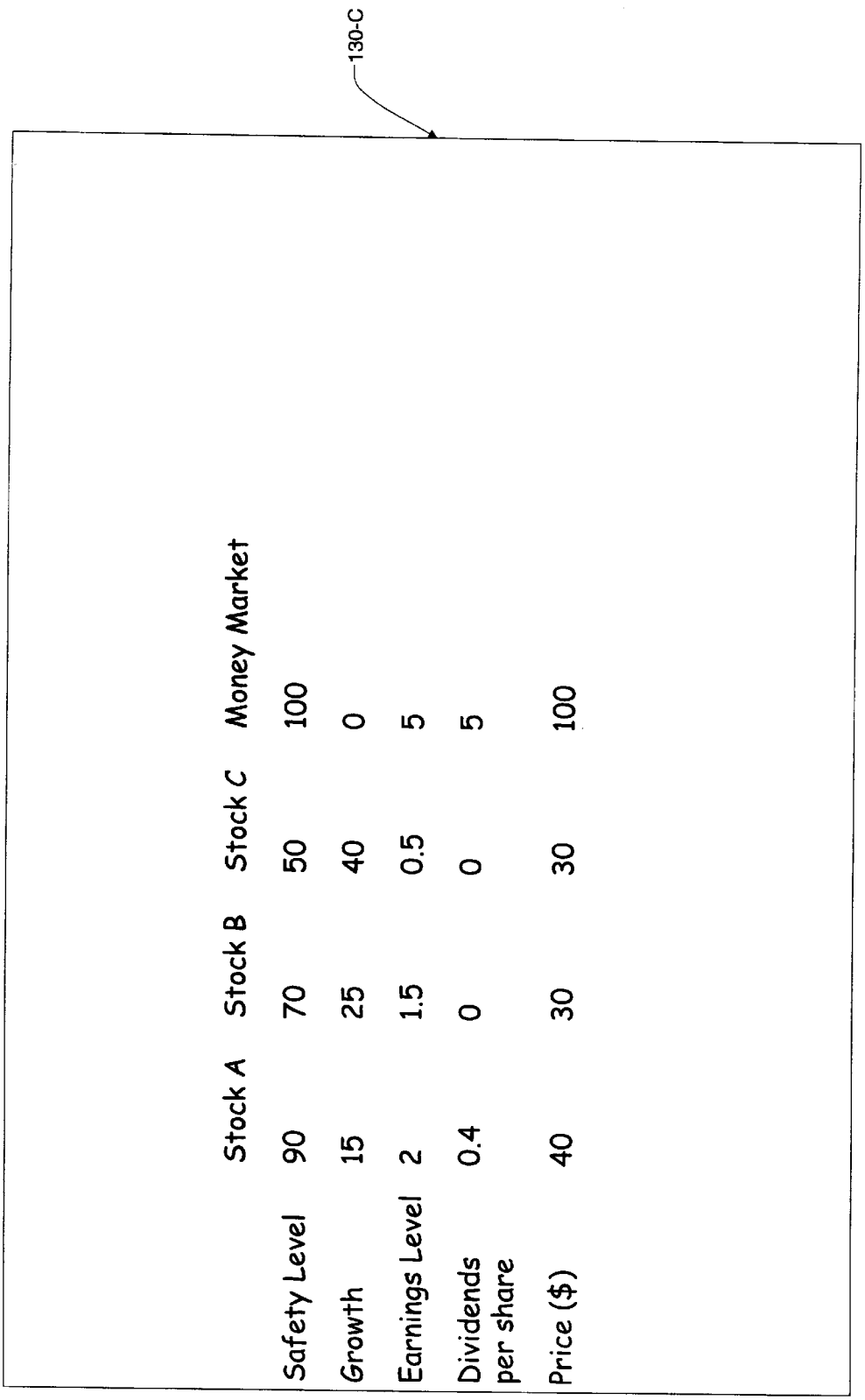
Figure 3E:
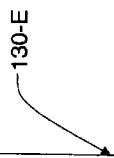
Figure 3L:
Figure 3M:
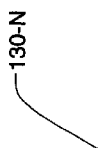

Preferably users will subscribe to the service provided by the APS system 102. A typical user will access the APS system 102 using the user's computer system, e.g., user computer system 112-n. The subscription and login processes are not shown or described, since standard methods can be used for these processes. FIG. 2 is a flowchart showing the operation of an embodiment of the present invention. Once the user has logged on (at 200), the system operates as follows:

Identify Characteristics

First the user (investor) must search his mind to identify all the characteristics (at 202) of stocks in general that the user considers important factors for his investment objectives. Examples of such factors are: dividends, rate of growth of earnings, financial strength, safety, predictability of earnings, and the like. Since many investors use financial advisory services, a user may include performance rankings provided by particular services.

Second, the user decides on the number of stocks (at 204) the user wishes to include in the portfolio, taking account of the fact that generally the safety of the whole portfolio will increase as the number of stocks increases. The user may be asked to specify an actual number of stocks or can be asked to specify a safety level, allowing the user to provide a corresponding number of stocks based on the selected safety level.

Any limitation on the amount of investment in each candidate stock must also be specified—perhaps relating it to a standardized commercial rating such as the Standard and Poor ratings or some other measure of financial strength.

Construct Matrix

Once the user's requirements and characteristics have been entered, the APS System 102 constructs an n×m matrix, M, with n characteristics and investment limits across the top, and the m candidate stocks down the side. This matrix, M, may be stored in computer memory 104 along with other data structures 128 used by program 126.

The programming technique used by preferred embodiments of this invention requires that numerical quantities be inserted into every cell of this matrix M. Since some characteristics provided by users are qualitative, not quantitative, it is necessary to translate the qualitative characteristics into quantitative values. This translation is a subjective valuation process for the user. For instance, consider a hypothetical user who wishes to include "performance in the next twelve months" as published by the Value Line Investment Survey, which ranks estimated stock performance from one to five, one being the highest. The APS system 102 of this invention needs to convert each rank into a quantitative value. To do so, the system asks the user if the user values rank one as equal to ten, how the user values the rankings of two, three, four and five. For example an investor might value the rankings as follows:

| Rank | Valuation |
|------|-----------|
| 1 | 10 |
| 2 | 7 |
| 3 | 4 |
| 4 | 3 |
| 5 | 2 |

Each stock's Value Line Performance is then be translated into an actual quantity according to this schedule. The same procedure is applied for each and every qualitative characteristic the user wishes to take into account.

The automated system allows the user to demand any specific features of his portfolio the user may desire, e.g., total dividends as a percentage of capital invested, average price earnings ratio, an average safety level, average predictability of earnings, and the like. The system is very versatile in this respect since any number of such "constraints" on the portfolio can be selected and minimum levels specified, and the system will always produce a portfolio that maximizes valuation, only after faithfully satisfying the constraints, (unless the user is too greedy and all his constraints cannot be satisfied at the same time, in which case the user would then have to relax-one or more of them).

Recall that the aim of so-called mathematical or linear programming is to define and then maximize a so-called "objective function."

After specifying all "constraints," the user would like to maximize the rate of growth of the market value of his portfolio. But since the value of each stock will be determined by the market, the task becomes one of trying to reflect in the user's "objective function"—which will be a combination of many factors—the set of considerations that the user believes will achieve this result.

According to the logic of so-called "fundamental" investment, investors should value a stock by estimating its future annual earnings to infinity and discounting them at the prevailing long term rate of interest to yield its total present discounted value. Being "fundamental" investors, we believe earnings per share and their forecast rates of growth now and in the future are the most crucial variables an investor should take into account in a user's objective function. But such factors as reliability of earnings estimates, skepticism about longer run projections of earnings, rankings by securities analysts, and the like should also be considered as factors and given substantial weight when constructing the objective function. Further, each investor will have different views as to which factors to include and the relative importance that should be attached to each of the factors selected.

Even if an investor has a good idea of what factors she should consider and the level of consideration she should give to each, there are several difficult problems in finding a systematic, logical method of determining the relative valuations the user is placing on each of the candidate stocks. Techniques, according to the present invention, first establish the value of his objective function, and then utilize the function in mathematical optimization of an investor's portfolio.

A. Procedure Used to Establish Objective Function (at 208)

1. Standardization of Units (at 208-1)

Although all variables, including qualitative variables, can be converted into quantitative valuations, they are measured in different units. These cannot be added together as is in any way. If they are to be combined into one objective function, a conversion factor must be established for each variable in order to convert their units to some "standardized" unit of "evaluation" in the computations.

As an example suppose the user has chosen the following factors to be combined into his objective function:

| Factor | Units |
| --- | --- |
| Factor 1. Value Line Performance Rating | 0–10 |
| Factor 2. Increase in earnings per share-Short Term | $ per share |
| Factor 3. Increase in earnings per share-Long Term | $ per share |
| Factor 4. Return on Equity | 0–30 Percent |

In order to standardize, first divide any dollar figure-in this case factors two and three-by the current price of the stock creating new variables 2' and 3' which are, in effect, "figures of merit". Next, compute the arithmetic average of each of the four variables 1, 2', 3', 4 for the universe of candidate stocks. Then standardize the units in terms of that of one of the factors by computing standardization weights. For example, we can standardize on the Factor One's unit as follows:

| | Factor 1 | Factor 2' | Factor 3' | Factor 4 |
| --- | --- | --- | --- | --- |
| Average Value | 7 | 0.30 | 0.50 | 19 |
| Standardizing Weight | 1 | 23.33 | 14 | .37 |

2. Establish Degree of Importance of Factors (208-2)

The user must establish what degree of importance in the abstract the user attaches to each of the actual factors. In other words, the user is asked to give each factor a relative weight. In a preferred embodiment the user is asked a question such as: "You have 100 points to allocate between these four factors. Allocate these points in proportion to the relative importance you give to each factor in determining your valuation of the stock." Assume, for the example using four factors, the user allocates the hundred points between the four factors in the ratios 30, 30, 20, 10 respectively.

| | Factor 1 | Factor 2 | Factor 3 | Factor 4 |
| --- | --- | --- | --- | --- |
| a. Standardizing Weight | 1 | 23.33 | 14 | 0.37 |
| b. Weights (Total 100) | 30 | 30 | 20 | 10 |
| c. Combined Weight (a × b) | 30 | 700 | 280 | 3.7 |

B. Use Objective Function in Optimizing Portfolio (at 210)

The established combined weights are now used to establish the actual objective function which will be used in producing the portfolio. The objective function measures the user's relative total valuation of each of the candidate stocks—the measure which in the mathematical computations will be related to the price of that stock to produce the maximum amount of his "valuation" possible from his available capital, subject to implementing at the same time all the constraints the user may have imposed.

The objective function is a weighted sum of the actual chosen variables. However, since the calculations which control the mathematical procedures used in maximizing valuation will always be comparing price with valuation for each individual factor this weighted sum will be:

Value Line Performance Ranking×Price×30+Increase in Earnings Per Share-Short Run×700+Increase in Earnings Per share-Long Run×280+Return on Equity×Price×3.9

In other words the following rules must be observed:

1. When standardizing units:
   All dollar per share factors are divided by price.
   All non-dollar factors are actual values; and
2. When constructing the actual objective function:
   All dollar per share factors are actual value.
   All non-dollar factors are multiplied by price.

The output of the mathematical programming is the set of individual stocks and the number of shares of each which, as a portfolio, yields the greatest "valuation" possible from the universe of candidate stocks. One output of the mathematical programming (the "marginal") also enables the user to see the relative effect on the maximum valuation of increasing or decreasing by one dollar the investment in each portfolio stock.

EXAMPLE

Upon connecting to APS System 102, a user is first given an explanation of the system as well as some background information, then the user is guided through the optimum portfolio selection process. FIGS. 3A–3M show various display screens 130-A to 130-N, respectively, which would be seen by a user on display 122 during a typical interaction with APS System 102.

The following is a worked example of the use of the APS system 102 to produce/modify a-portfolio. (The portfolio determined in this example was based on securities' values on Dec. 15, 1994.) The matrix included a column showing (for each stock then in the portfolio) the dollar capital gain or loss tax effect if the stock was sold. About 400 additional candidate stocks were added to the matrix.

1. Constraints
   Only on the dollar value of the portfolio.
2. Upper bounds: (on dollar investment in each stock)

| Value Line Financial Strength | Investment Ratio |
| --- | --- |
| A++, A+ | 10.0 |
| A, B++ | 9.2 |
| B+, B | 7.7 |
| C++ | 1.2 |
| C | 0.6 |

3. Valuation of Value Line "Safety"
   Value Line Safety was given no consideration. i.e., current diversification (50 stocks) was considered sufficient to assure adequate safety. Diversification (50 stocks) considered sufficient to assume reduced portfolio risk.

4. Line "Timeliness"

| Rank | Valuation |
| --- | --- |
| 1 | 0.75 |
| 2 | 0.50 |
| 3 | 0.25 |
| 4 | 0.10 |
| 5 | 0.10 |

5. Weighting (After Standardization)

| Factor | Weight |
| --- | --- |
| Value Line Timeliness | 30 |
| Increase in Earnings per Share: | |
| Last 12 months | 3 |
| Next 12 months | 30 |
| Next 3–5 years | 10 |
| Increase in sales per share: | |
| Next 12 months | 20 |

6. Weighting Procedure

| | Value Line | Increase in Earnings per share divided by price | | | Percent Increase in Sales |
| --- | --- | --- | --- | --- | --- |
| | Performance | Last 12 months | Next 12 Months | 3–5 Years | Next 12 Months |
| Average | 0.4191 | 0.0134 | 0.01156 | 0.0429 | 0.11817 |
| Standard | 1 | 25.64 | 36.25 | 9.77 | 3.55 |
| Weight | 0.3 | 0.03 | 0.3 | 0.1 | 0.2 |
| Final Weight | 0.3 | 0.77 | 10.88 | 0.98 | 0.709 |

7. Results of Linear Programming (Suggested Change in Existing Portfolio)

| | Earnings Per Share | | | |
| --- | --- | --- | --- | --- |
| Stock | Last 12 M | Next 12 M | 2000- | Marginal |
| SELLS: | | | | |
| Diagnostek | 1.09 | 0.92 | 1.95 | −.411 |
| Conseco Inc. | 6.24 | 6.44 | 13.00 | −.254 |
| Travellers Inc. | 4.05 | 3.96 | 7.75 | −.250 |
| Philip Morris | 5.18 | 5.74 | 8.65 | −.209 |
| Champion Enterp. | 3.03 | 3.23 | 4.35 | −.125 |
| United Health Care | 1.81 | 2.04 | 4.00 | −.121 |
| Canadagua Wine A | 1.65 | 2.22 | 3.55 | −.112 |
| Citicorp | 5.49 | 6.29 | 8.00 | −.103 |
| Integrated Device | 1.76 | 2.09 | 3.15 | −.102 |
| Compaq Computer | 2.94 | 3.37 | 4.50 | −.102 |
| BUYS: | | | | |
| Terra Inc. | 0.53 | 1.21 | 2.00 | .772 |
| Safeguard Scientific | 1.68 | 2.63 | 5.45 | .686 |
| Nortek | 1.01 | 1.65 | 3.00 | .667 |
| ICN Pharm. | 1.47 | 2.06 | 5.39 | .610 |
| USX-US Steel | 1.31 | 3.94 | 7.00 | .524 |
| Allied Products | 1.26 | 1.96 | 3.25 | .498 |
| QMS | 0.28 | 0.61 | 2.00 | .467 |
| Nova Corp. | 0.41 | 0.95 | 1.20 | .357 |
| First Mississippi | 1.57 | 2.70 | 3.00 | .301 |
| Esterline Techn. | 1.01 | 1.20 | 1.50 | .262 |
| Birmingham Steel | 1.14 | 2.00 | 3.85 | .260 |
| USF&G Corp. | 1.08 | 1.26 | 4.00 | .229 |
| Lyondell Pete. | 1.67 | 2.38 | 4.70 | .225 |

Note: In the above example, the range of the marginal was +0.772 to −0.411.

Although described with reference to a particular system, the present invention operates on any computer system and can be implemented in software, hardware or any combination thereof. When implemented fully or partially in software, the invention can reside, permanently or temporarily, on any memory or storage medium, including but not limited to a RAM, a ROM, a disk, an ASIC, a PROM and the like.

Thus, methods, systems and devices for automated portfolio selection system are provided. One skilled in the art will appreciate that the present invention can be practiced by other than the described embodiments, which are presented for purposes of illustration and not limitation, and the present invention is limited only by the claims that follow.

What is claimed:

1. A method of automatically selecting a user's optimum securities portfolio from a plurality of candidate securities comprising:

receiving a user's selection of desirable investment characteristics of securities that he considers important for valuation of securities;

constructing a user-specific n×m matrix, where n is the number of investment characteristics and m is the number of candidate securities, the entries consisting of a quantitative estimate or qualitative ranking made for each characteristic of each security by security analysts;

converting each qualitative ranking of an investment characteristic into a set of quantitative estimates reflecting the user's relative valuation of each rank;

where an investment characteristic is measured in dollars per share, converting the measure to dollars per dollar invested by dividing by the current price per share;

to ensure that measurement of all investment characteristics is on the same quantitative scale, standardizing the unit of measurement in which all are measured by selecting the unit of measurement of one characteristic as a standard and multiplying the entries for each other characteristic by an average value of the selected characteristic among all candidate securities divided by an average value of that other characteristic thereby creating a user-specific unit-standardized n×m matrix;

receiving the percentage weighting the user would apply to each of his selected investment characteristics when evaluating an investment security's ability to meet his needs and to grow in value;

computing for each security, its user-specific, relative utility function $$u = \sum_1^n V_n \cdot W_n$$

where u is the relative utility of the security to the user, $V_n$ is value of characteristic n for the security in the unit-standardized n×m matrix and $W_n$ is the user's percentage weighting applied to characteristic n;

receiving a definitive measure of the user's risk-tolerance in the form of a quantitative limit set by the user on the amount of investment in each security according to its safety level set by a security analyst;

receiving any overall constraints the user may wish to impose on his portfolio such as minimum percentage cash income or maximum price earnings ratio; and determining the user's optimum portfolio by employing the linear programming algorithm to maximize the user's relative utility function subject to total investment equaling available capital, the investment limits on each security not being exceeded and all overall constraints on the portfolio being achieved.

2. A method as in claim 1 wherein the user-selected investment characteristics are selected from the group consisting of:

dividends, rate of growth of earnings, financial strength, safety, predictability of earnings, technical ranking, sales, cash flow, free cash flow, earnings as percent of common equity, earnings as percent of total capital, common equity ratio, stock price stability, price growth persistence, total return, and performance rankings provided by security analysts.

3. A method as in claim 1 wherein the safety level is provided as a number of stocks to include in the portfolio.

4. A device for automatic selection of a user's optimum securities portfolio from a plurality of candidate securities, the device comprising:

means for receiving a user's selection of desirable investment characteristics of securities that he considers important for valuation of securities;

means for constructing a user-specific n×m matrix, where n is the number of investment characteristics and m is the number of candidate securities, the entries consisting of a quantitative estimate or qualitative ranking made for each characteristic of each security by security analysts;

means for converting each qualitative ranking of an investment characteristic into a set of quantitative estimates reflecting the user's relative valuation of each rank;

means for, where an investment characteristic is measured in dollars per share, converting the measure to dollars per dollar invested by dividing by the current price per share;

to ensure that measurement of all investment characteristics is on the same quantitative scale, means for standardizing the unit of measurement in which all are measured by selecting the unit of measurement of one characteristic as a standard and multiplying the entries for each other characteristic by an average value of the selected characteristic among all candidate securities divided by an average value of that other characteristic thereby creating amuser-specific unit-standardized n×m matrix;

means for receiving the percentage weighting the user would apply to each of his selected investment characteristics when valuating an investment security's ability to meet his needs and to grow in value;

means for computing for each security, its user-specific, relative utility function $$u = \sum_1^n V_n \cdot W_n$$

where u is the relative utility of the security to the user, $V_n$ is value of characteristic n for the security in the unit-standardized n×m matrix and $W_n$ is the user's percentage weighting applied to characteristic n;

means for receiving a definitive measure of the user's risk-tolerance in the form of a quantitative limit set by the user on the amount of investment in each security according to its safety level set by a security analyst;

means for receiving any overall constraints the user may wish to impose on his portfolio such as minimum percentage cash income or maximum price earnings ratio; and means for determining the user's optimum portfolio by employing the linear programming algorithm to maximize the user's relative utility function subject to total investment equaling available capital, the investment limits on each security not being exceeded and all overall constraints on the portfolio being achieved.

5. A device as in claim 4 wherein the user-selected investment characteristics are selected from the group consisting of:

dividends, rate of growth of earnings, financial strength, safety, predictability of earnings, technical ranking, sales, cash flow, free cash flow, earnings as percent of common equity, earnings as percent of total capital, common equity ratio, stock price stability, price growth persistence, total return, and performance rankings provided by security analysts.

6. A device as in claim 4 wherein the safety level is provided as a number of stocks to include in the portfolio.

7. A method of automatically selecting a user's optimum securities portfolio from a plurality of candidate securities comprising:

(A) receiving a user's selection of desirable investment characteristics of securities that he considers important for valuation of securities, wherein the user-selected investment characteristics are selected from the group consisting of: dividends, rate of growth of earnings, financial strength, safety, predictability of earnings, technical ranking, sales, cash flow, free cash flow, earnings as percent of common equity, earnings as percent of total capital, common equity ratio, stock price stability, price growth persistence, total return, and performance rankings provided by security analysts;

(B) constructing a user-specific n×m matrix, where n is the number of investment characteristics and m is the number of candidate securities, the entries consisting of a quantitative estimate or qualitative ranking made for each characteristic of each security by security analysts;

(C) converting each qualitative ranking of an investment characteristic into a set of quantitative estimates reflecting the user's relative valuation of each rank;

(D) where an investment characteristic is measured in dollars per share, converting the measure to dollars per dollar invested by dividing by the current price per share;

(E) to ensure that measurement of all investment characteristics is on the same quantitative scale, standardizing the unit of measurement in which all are measured by selecting the unit of measurement of one characteristic as a standard and multiplying the entries for each other characteristic by an average value of the selected characteristic among all candidate securities divided by an average value of that other characteristic thereby creating a user-specific unit-standardized n×m matrix;

(F) receiving the percentage weighting the user would apply to each of his selected investment characteristics when valuating an investment security's ability to meet his needs and to grow in value;

(G) computing for each security, its user-specific, relative utility function $$u = \sum_{1}^{n} V_n \cdot W_n$$

where u is the relative utility of the security to the user, $V_n$ is value of characteristic n for the security in the unit-standardized n×m matrix and $W_n$ is the user's percentage weighting applied to characteristic n;

(H) receiving a definitive measure of the user's risk tolerance in the form of a quantitative limit set by the user on the amount of investment in each security according to its safety level set by a security analyst;

(I) receiving any overall constraints the user may wish to impose on his portfolio such as minimum percentage cash income or maximum price earnings ratio; and (J) determining the user's optimum portfolio by employing the linear programming algorithm to maximize the user's relative utility function subject to total investment equaling available capital, the investment limits on each security not being exceeded and all overall constraints on the portfolio being achieved.

* * * * *